United States Patent [19]
Black et al.

[11] Patent Number: 6,066,427
[45] Date of Patent: May 23, 2000

[54] METHODS FOR MAKING A CHARGE GENERATING LAYERS COMPRISING TYPE I POLYMORPH OF TITANYL PHTHALOCYANINE WITH REDUCED PHOTOSENSITIVITY AND PHOTOCONDUCTORS INCLUDING THE SAME

[75] Inventors: David Glenn Black, Longmont; Laura Lee Kierstein, Johnstown; Ronald Harold Levin, Boulder, all of Colo.

[73] Assignee: Lexmark International, Inc., Lexington, Ky.

[21] Appl. No.: 09/360,596

[22] Filed: Jul. 26, 1999

[51] Int. Cl.[7] .............................. C09B 67/04; G03G 5/06; G03G 5/047
[52] U.S. Cl. ..................... 430/58.4; 430/59.5; 430/135; 540/141
[58] Field of Search .................... 430/58.4, 59.5, 430/135; 540/141

[56] References Cited

U.S. PATENT DOCUMENTS

| | | | |
|---|---|---|---|
| 5,350,844 | 9/1994 | Martin et al. | 540/141 |
| 5,686,213 | 11/1997 | Cosgrove et al. | 430/56 |
| 5,750,300 | 5/1998 | Nguyen | 430/78 |

FOREIGN PATENT DOCUMENTS

| | | |
|---|---|---|
| 3716982 | 11/1987 | Germany . |
| 57-138644 | 8/1982 | Japan . |
| 61-043752 | 3/1986 | Japan . |
| 62-006262 | 1/1987 | Japan . |

*Primary Examiner*—Roland Martin
*Attorney, Agent, or Firm*—John A. Brady

[57] ABSTRACT

Charge generation layers comprise a type I polymorph of titanyl phthalocyanine prepared by pre-milling a type IV polymorph in a media mill. Dual layer photoconductors comprise the charge generation layer in combination with a substrate and a charge transport layer.

20 Claims, 4 Drawing Sheets

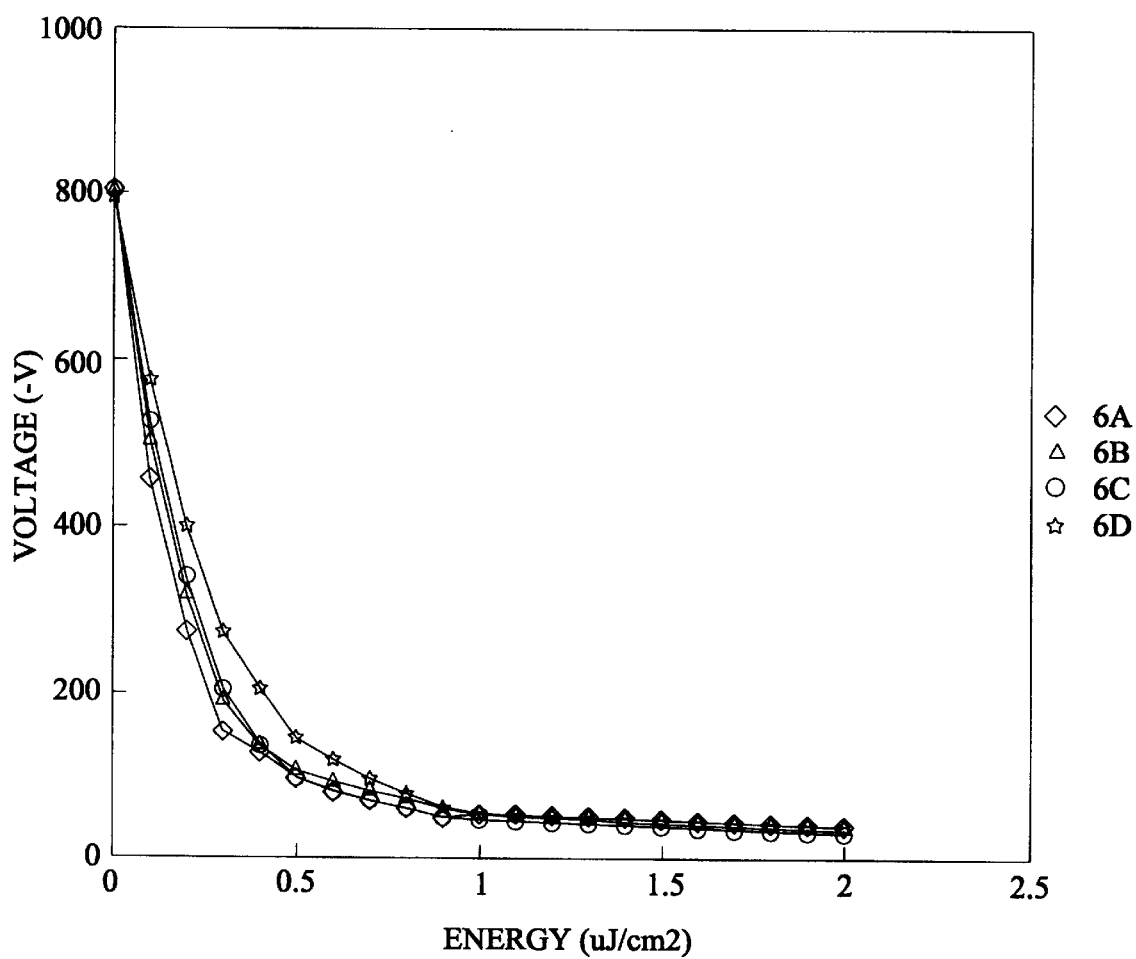

METHODS FOR MAKING A CHARGE GENERATING LAYERS COMPRISING TYPE I POLYMORPH OF TITANYL PHTHALOCYANINE WITH REDUCED PHOTOSENSITIVITY AND PHOTOCONDUCTORS INCLUDING THE SAME

FIELD OF THE INVENTION

The present invention is directed to charge generation layers and dual layer photoconductors including the same. More particularly, the invention is directed to such dual layer photoconductors and charge generation layers wherein the charge generation layer includes a type I polymorph of titanyl phthalocyanine having reduced photosensitivity.

BACKGROUND OF THE INVENTION

In electrophotography, a latent image is created on the surface of an imaging member such as a photoconducting material by first uniformly charging the surface and then selectively exposing areas of the surface to light. A difference in electrostatic charge density is created between those areas on the surface which are exposed to light and those areas on the surface which are not exposed to light. The latent electrostatic image is developed into a visible image by electrostatic toners. The toners are selectively attracted to either the exposed or unexposed portions of the photoconductor surface, depending on the relative electrostatic charges on the photoconductor surface, the development electrode and the toner.

Typically, a dual layer electrophotographic photoconductor comprises a substrate such as a metal ground plane on which a charge generation layer (CGL) and a charge transport layer (CTL) are coated. The charge transport layer contains a charge transport material or an electron transport material. For simplicity, the following discussions herein are directed toward the use of a charge transport layer which comprises a hole transport material as the charge transport compound. One skilled in the art will appreciate that if the charge transport layer contains an electron transport material rather than a hole transport material, the charge placed on a photoconductor surface will be opposite that described herein.

Generally, when the charge transport layer containing a hole transport material is formed on the charge generation layer, a negative charge is typically placed on the photoconductor surface. Conversely, when the charge generation layer is formed on the charge transport layer, a positive charge is typically placed on the photoconductor surface. Conventionally, the charge generation layer comprises a polymeric binder containing a charge generation compound or molecule while the charge transport layer comprises a polymeric binder containing the charge transport compound or molecule. The charge generation compounds within the CGL are sensitive to image-forming radiation and photogenerate electron-hole pairs within the CGL as a result of absorbing such radiation. Examples of charge generation compounds include metal and nonmetal phthalocyanine compounds. The CTL is usually non-absorbent of the image-forming radiation and the charge transport compound serves to transport holes to the surface of a negatively charged photoconductor. Photoconductors of this type are disclosed in the Adley et al., U.S. Pat. No. 5,130,215 and the Balthis et al., U.S. Pat. No. 5,545,499.

In Martin et al., U.S. Pat. No. 5,350,844, there is disclosed a process for the preparation of a 'more perfect' crystalline form of the type I polymorph of titanyl phthalocyanine for use as a charge generation compound. The 'more perfect' form of type I polymorph of titanyl phthalocyanine is formed by a method which comprises dissolving a precursor type I polymorph of titanyl phthalocyanine in a solution of trihaloacetic acid and alkylene chloride. The resulting solution is then mixed with solvent, enabling precipitation of a type X polymorph of titanyl phthalocyanine. The type X polymorph of titanyl phthalocyanine is separated from the solution and washed. A slurry is formed with the type X titanyl phthalocyanine and an organic solvent which enables conversion of the type X polymorph to a type IV polymorph of titanyl phthalocyanine. The type IV polymorph is then subjected to either (1) organic solvent treatment, or (2) milling to reach the 'more perfect' crystalline form of type I polymorph of titanyl phthalocyanine. The milling step comprises a ball mill with stainless steel balls and dichloromethane. The 'more perfect' crystalline form of the type I polymorph of titanyl phthalocyanine is disclosed as exhibiting increased photosensitivity when compared to the precursor type I titanyl phthalocyanine.

In Cosgrove et al., U.S. Pat. No. 5,686,213, there is disclosed a method for forming electrophotographic photoconductors which include the steps of selecting a desired sensitivity range and a desired light intensity for a photoconductor and forming the photoconductor having the desired sensitivity range and desired light intensity. Cosgrove et al disclose that sensitivity of perylene pigments increases with milling. Cosgrove et al further disclose that metal phthalocyanines may also be tuned in this manner. Specifically, Cosgrove et al found that the electrical response characteristics of the photoconductor are directly related to the milling time when other factors (such as photoconductor construction) are held constant. That is, Cosgrove et al disclose that as milling time increases, the sensitivity increases. Thus, by selecting an appropriate milling time based on the desired sensitivity, a photoconductor with a specifically desired photo-induced discharge curve may be provided.

The laser printer industry requires a tremendous range of photosensitivities which are dictated by performance constraints of a printer. Specifically, in certain applications, laser printers with decreased photosensitivities are desired. A method of decreasing the photosensitivity of the charge generation layer and photoconductors including the same are therefore desired.

SUMMARY OF THE INVENTION

Accordingly, it is an object of the present invention to provide charge generation layers and photoconductors including the same which exhibit decreased photosensitivity, particularity relative to similar charge generation layers and photoconductors employing conventional titanyl phthalocyanine compounds. More particularly, it is an object of the present invention to provide dual layer photoconductors which exhibit decreased photosensitivity. It is yet a further object of the invention to provide dual layer photoconductors which exhibit improved dark decay, i.e., reduced loss of charge from the surface of the photoconductor when it is maintained in the dark.

These and additional objects and advantages are provided by the charge generation and dual layer conductors according to the present invention in which the charge generation layer includes a type I polymorph of titanyl phthalocyanine.

Generally, the photoconductors according to the present invention comprise a substrate, a charge generation layer and a charge transport layer, wherein the charge transport layer comprises a binder and a charge transport compound and the charge generation layer comprises a binder and a charge generation compound. The charge generation compound is a type I polymorph of titanyl phthalocyanine produced according to a specified method. The type I polymorph of titanyl phthalocyanine has reduced photosensitivity as compared to conventional type I polymorphs of titanyl phthalocyanine. The dual layer photoconductors according to the present invention are advantageous in that they exhibit decreased sensitivity. The photoconductors according to the present invention are further advantageous in that they exhibit a noticeable reduction in dark decay as compared with conventional photoconductors.

The present invention is directed to a method for forming a type I polymorph of titanyl phthalocyanine with reduced photosensitivity from a type IV polymorph of titanyl phthalocyanine. The method comprises pre-milling a type IV polymorph in the presence of an organic solvent with a media mill for a period of time sufficient to convert the type IV polymorph of titanyl phthalocyanine to a type I polymorph of titanyl phthalocyanine. The term "pre-milling" refers to milling of the type IV polymorph of titanyl phthalocyanine to a type I polymorph of titanyl phthalocyanine in the absence of a polymeric binder. Conventional "milling" refers to the milling of the type IV polymorph of titanyl phthalocyanine to a type I polymorph of titanyl phthalocyanine in the presence of a polymeric binder.

The present invention is also directed to a method for forming a charge generation layer with reduced photosensitivity from a type IV polymorph of titanyl phthalocyanine. The method comprises pre-milling the type IV polymorph of titanyl phthalocyanine with a media mill in the presence of an organic solvent in a media mill for a period of time sufficient to convert the type IV polymorph of titanyl phthalocyanine to a type I polymorph of titanyl phthalocyanine. A polymeric binder is dispersed in organic solvent to provide a binder dispersion. The binder dispersion is added to the pre-milled type IV polymorph of titanyl phthalocyanine and milled in the media mill. The resulting composition is diluted with a solution comprising a polymeric binder dispersed in an organic solvent. The diluted type I polymorph solution is then coated on a substrate to form a charge generation layer. The sensitivity can be tuned in a reproducible manner by choice of pre-milling times.

The present invention is also directed to a charge generation layer comprising a type I polymorph of titanyl phthalocyanine having reduced photosensitivity and produced by the process of the present invention.

The present invention is further directed to a photoconductor comprising a charge generation layer and a charge transport layer. The charge generation layer comprises a polymeric binder and a charge generation compound. The charge generation compound comprises a type I polymorph of titanyl phthalocyanine having reduced photosensitivity produced by the process of the present invention.

These and additional objects and advantages will be further apparent in view of the following detailed description.

BRIEF DESCRIPTION OF THE DRAWING

The present invention as set forth in the detailed description will be more fully understood when viewed in connection with the drawings in which:

FIG. 4 sets forth electrical performance properties of photoconductors 6A–6D according to the present invention wherein the charge generation layers include charge generation compounds comprising a type IV polymorph of titanyl phthalocyanine and are made according to the present methods with the addition of a polymeric binder added during the pre-milling step as described in Example 4.

DETAILED DESCRIPTION

Figure 1:
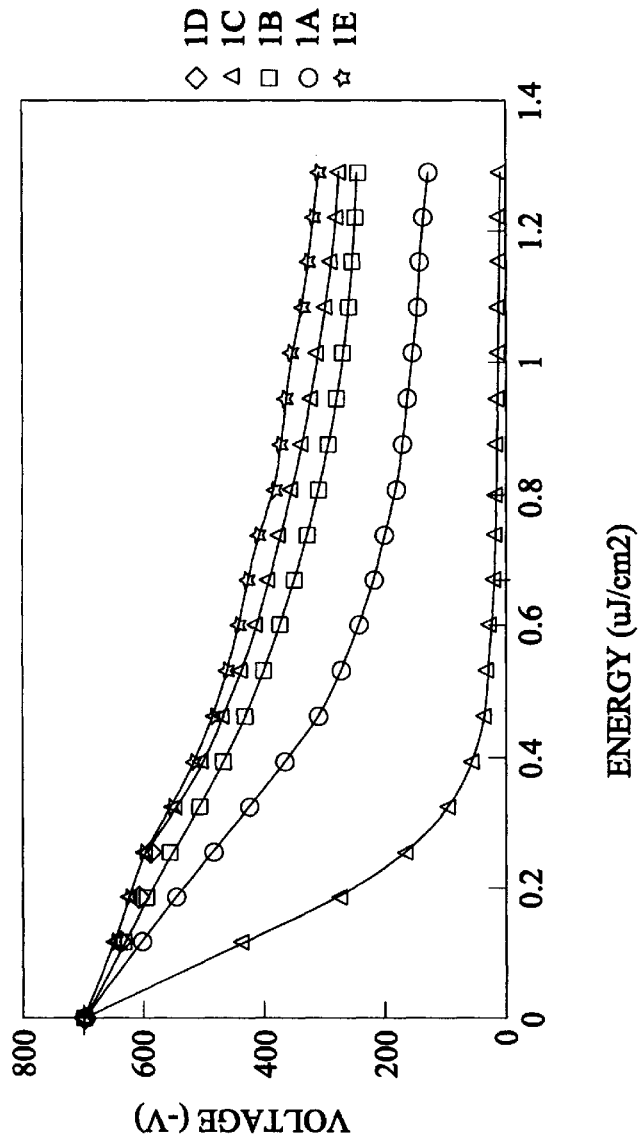
FIG. 1 sets forth electrical performance properties of photoconductors 1A–1D according to the present invention wherein the premilling of charge generation dispersion results in charge generation layers including charge generation compounds comprising a type I polymorph of titanyl phthalocyanine and are made according to the present methods, and electrical performance properties of a conventional photoconductor 1E wherein the charge generation compound comprises a type IV polymorph of titanyl phthalocyanine in which no pre-milling has occurred, as described in Example 1.

The charge generation layers according to the present invention are suitable for use in dual layer photoconductors. Such photoconductors generally comprise a substrate, a charge generation layer and a charge transport layer. While various embodiments of the invention disclosed herein refer to the charge generation layer as being formed on the substrate, with the charge transport layer formed on the charge generation layer, it is equally within the scope of the present invention for the charge transport layer to be formed on the substrate with the charge generation layer formed on the charge transport layer.

The charge generation layers according to the present invention comprise a binder and a charge generation compound. The charge generation compound comprises a type I polymorph of titanyl phthalocyanine produced by the process which is described below The photoconductor substrate may be flexible, for example in the form of a flexible web or a belt, or inflexible, for example in the form of a drum. Typically, the photoconductor substrate is uniformly coated with a thin layer of metal, preferably aluminum which functions as an electrical ground plane. In a preferred embodiment, the aluminum is anodized to convert the aluminum surface into a thicker aluminum oxide surface. Alternatively, the ground plane member may comprise a metallic plate formed, for example, from aluminum or nickel, a metal drum or foil, or plastic film on which aluminum, tin oxide, indium oxide or the like is vacuum evaporated. Typically, the photoconductor substrate will have a thickness adequate to provide the required mechanical stability. For example, flexible web substrates generally have a thickness of from about 0.01 to about 0.1 microns, while drum substrates generally have a thickness of from about 0.75 mm to about 1 mm.

In a preferred embodiment, the charge generation layer may be formed on the photoconductor substrate, followed by formation of the charge transport layer containing a hole transport compound, whereby a negative charge may be placed on the photoconductor surface. Conversely, the charge transport layer containing a hole transport compound may be formed in the photoconductor substrate and the charge generation layer is in turn formed on the charge transport layer, whereby a positive charge may be placed on the photoconductor surface. On the other hand, as one skilled in the art will appreciate, if the charge transport layer contains electron transport material, the charges which may be placed on the photoconductor surface as a result of the arrangement of the charge transport and charge generation layers will be reversed.

The charge transport layer included in the dual layer photoconductors of the present invention comprises binder and a charge transport compound. The charge transport layer is in accordance with the conventional practices known in the art and therefore may include any binder and any charge transport compound generally known in the art for use in dual layer photoconductors. Typically, the binder is polymeric and may comprise, but is not limited to, vinyl polymers such as polyvinyl chloride, polyvinyl butyral, polyvinyl acetate, styrene polymers, and copolymers of these vinyl polymers, acrylic acid and acrylate polymers and copolymers, polycarbonate polymers and copolymers, including polycarbonate-A which is derived from bisphenol-A, polycarbonate-Z, which is derived from cyclohexylidene bisphenol, polycarbonate-C, which is derived from methylbisphenol-A, polyestercarbonates, polyesters, alkyd resins, polyamides, polyurethanes, epoxy resins and the like. Preferably, the polymeric binder of the charge transport layer is inactive, i.e., it does not exhibit charge transport properties.

Conventional charge transport compounds suitable for use in the charge transport layer of the photoconductors of the present invention should be capable of supporting the injection of photo-generated holes or electrons from the charge generation layer and allowing the transport of these holes or electrons through the charge transport layer to selectively discharge the surface charge. Suitable charge transport compounds for use in the charge transport layer include, but are not limited to, the following:

1. Diamine transport molecules of the types described in U.S. Pat. Nos. 4,306,008, 4,304,829, 4,233,384, 4,115,116, 4,299,897, 4,265,990 and/or 4,081,274. Typical diamine transport molecules include N,N'-diphenyl-N,N'-bis (alkylphenyl)-[1,1'-biphenyl]-4,4'-diamines wherein the alkyl is, for example, methyl, ethyl, propyl, n-butyl, or the like, or halogen substituted derivatives thereof, and the like.

2. Pyrazoline transport molecules as disclosed in U.S. Pat. Nos. 4,315,982, 4,278,746 and 3,837,851. Typical pyrazoline transport molecules include 1-[lepidyl-(2)]-3-(p-diethylaminophenyl)-5-(p-diethylaminophenyl)pyrazoline, 1-[quinolyl-(2)]-3-(p-diethylaminophenyl)-5-(p-diethylaminophenyl)pyrazoline, 1-[pyridyl-(2)]-3-(p-diethylaminostyryl)-5-(p-diethylaminophenyl)pyrazoline,1-[6-methoxypyridyl-(2)]-3-(p-diethylaminostyryl)-5-(p-diethylaminophenyl) pyrazoline, 1-phenyl-3-[p-diethylaminostyryl]-5-(p-dimethylaminostyryl)pyrazoline, 1-phenyl-3-[p-diethylaminostyryl]-5-(p-diethylaminostyryl) pyrazoline, and the like.

3. Substituted fluorene charge transport molecules as described in U.S. Pat. No. 4,245,021. Typical fluorene charge transport molecules include 9-(4'-dimethylaminobenzylidene)fluorene, 9-(4'-methoxybenzylidene)fluorene, 9-(2,4'-dimethoxybenzylidene)fluorene, 2-nitro-9-benzylidene-fluorene, 2-nitro-9-(4'-diethylaminobenzylidene)fluorene and the like.

4. Oxadiazole transport molecules such as 2,5-bis(4-diethylaminophenyl)-1,3,4-oxadiazole, imidazole, triazole, and others as described in German Patents Nos. 1,058,836, 1,060,260 and 1,120,875 and U.S. Pat. No. 3,895,944.

5. Hydrazone transport molecules including p-diethylaminobenzaldehyde(diphenylhydrazone), p-diphenylaminobenzaldehyde-(diphenylhydrazone), o-ethoxy-p-diethylaminobenzaldehyde-(diphenylhydrazone),o-methyl-p-diethylaminobenzaldehyde-(diphenylhydrazone), o-methyl-p-dimethylaminobenzaldehyde(diphenylhydrazone), p-dipropylaminobenzaldehyde-(diphenylhydrazone), p-diethylaminobenzaldehyde-(benzylphenylhydrazone), p-dibutylaminobenzaldehyde-(diphenylhydrazone), p-dimethylaminobenzaldehyde-(diphenylhydrazone) and the like described, for example, in U.S. Pat. No. 4,150,987. Other hydrazone transport molecules include compounds such as 1-naphthalenecarbaldehyde 1-methyl-1-phenylhydrazone, 1-naphthalenecarbaldehyde 1,1-phenylhydrazone, 4-methoxynaphthlene-1-carbaldehyde 1-methyl-1-phenylhydrazone and other hydrazone transport molecules described, for example, in U.S. Pat. Nos. 4,385, 106, 4,338,388, 4,387,147, 4,399,208 and 4,399,207. Yet other hydrazone charge transport molecules include carbazole phenyl hydrazones such a 9-methylcarbazole-3-carbaldehyde-1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone,9-ethylcarbazole-3-carbaldehyde-1-ethyl-1-benzyl-1-phenylhydrazone, 9-ethylcarbazole-3-carbaldehyde-1,1-diphenylhydrazone, and other suitable carbazole phenyl hydrazone transport molecules described, for example, in U.S. Pat. No. 4,256,821. Similar hydrazone transport molecules are described, for example, in U.S. Pat. No. 4,297,426. Preferred hydrazone transport molecules include derivatives of aminobenzaldehydes, cinnamic esters or hydroxylated benzaldehydes. Exemplary amino benzaldehyde-derived hydrazones include those set forth in the Anderson et al U.S. Pat. Nos. 4,150,987 and 4,362,798, while exemplary cinnamic ester-derived hydrazones and hydroxylated benzaldehyde-derived hydrazones are set forth in the copending Levin et al U.S. application Ser. Nos. 08/988,600 and 08/988,791, respectively, all of which patents and applications are incorporated herein by reference.

In one embodiment, the charge transport compound included in the charge transport layer preferably comprises a hydrazone, an aromatic amine (including aromatic diamines), a substituted aromatic amine (including substituted aromatic diamines), or a mixture thereof.

The charge transport layer typically comprises the charge transport compound in an amount of from about 5 to about 60 weight percent, based on the weight of the charge transport layer, and more preferably in an amount of from about 15 to about 40 weight percent, based on the weight of the charge transport layer, with the remainder of the charge transport layer comprising the binder, and any conventional additives.

As set forth above, the charge generation layer comprises binder and a charge generation compound. Preferably, the binder of the charge generation layer is inactive, i.e., it does not exhibit either charge generation or charge transporting properties, and may comprise, but is not limited to, vinyl polymers such as polyvinyl chloride, polyvinyl butyral, polyvinyl acetate, styrene polymers, and copolymers of these polymers, acrylic acid and acrylate polymers and copolymers, polycarbonate polymers and copolymers, including polyestercarbonates, polyesters, alkyd resins, polyamides, polyurethanes, epoxy resins and the like. Preferably, the charge generation layer comprises a binder in an amount of from about 10 to about 90 weight percent and more preferably in an amount of from about 20 to about 75 weight percent, based on the weight of the charge generation layer.

The charge generation compound utilized in the present invention is a type I polymorph of titanyl phthalocyanine. The type I polymorph of titanyl phthalocyanine has been processed from a type IV polymorph of titanyl phthalocyanine. The method for forming a type I polymorph of titanyl phthalocyanine from a type IV polymorph of titanyl phthalocyanine comprises milling the type IV polymorph of titanyl phthalocyanine with a media mill in the presence of an organic solvent for a period of time sufficient to convert the type IV polymorph of titanyl phthalocyanine to a type I polymorph of titanyl phthalocyanine. Preferably, the milling of the type IV polymorph of titanyl phthalocyanine lasts at least 5 minutes. In a preferred embodiment, the organic solvent used in the media mill during the milling of type IV polymorph of titanyl phthalocyanine to obtain a type I polymorph of titanyl phthalocyanine comprises methyl ethyl ketone, although other solvents may be employed in place of or in combination with methyl ethyl ketone. A suitable media mill for use in the present invention may be commercially obtained from the Netzsch Corporation under the designation model LMJ05, although other media mills may also be employed.

Another embodiment of the present invention is a method for forming a charge generation layer with reduced photosensitivity from a type IV polymorph of titanyl phthalocyanine. The method comprises pre-milling the type IV polymorph of titanyl phthalocyanine with a media mill in the presence of an organic solvent for a period of time sufficient to convert the type IV polymorph of titanyl phthalocyanine to a type I polymorph of titanyl phthalocyanine. A polymeric binder is dispersed in an organic solvent to provide a binder dispersion. The type I polymorph of titanyl phthalocyanine is milled with the binder dispersion in the media mill. The resulting milled type I polymorph of titanyl phthalocyanine is diluted with an additional solution comprising a polymeric binder and an organic solvent to provide a diluted type I polymorph of titanyl phthalocyanine solution. Then the diluted type I polymorph of titanyl phthalocyanine solution is coated on a substrate to form an electrophotographic charge generation layer. In a preferred embodiment, the step of pre-milling lasts for at least 5 minutes. In another preferred embodiment, the organic solvent used in the milling steps comprises methyl ethyl ketone. In a further preferred embodiment, the polymeric binder in the charge generation layer comprises polyvinyl butyral.

Martin et al., U.S. Pat. No. 5,350,844 discloses conversion of a type IV polymorph of titanyl phthalocyanine to the 'more perfect' type I crystalline structure of titanyl phthalocyanine. Martin et al disclose two methods in which the conversion can be accomplished: (1) stirring the type IV polymorph of titanyl phthalocyanine in an organic solvent, or (2) dispersing the type IV polymorph of titanyl phthalocyanine in a ball mill. The mill used in the present invention is a high speed media mill. The media mill is capable of an agitator shaft speed in excess of 2200 rpm. The results obtained in the present invention are significantly different from those disclosed in Martin et al. Not being limited by theory, Applicants believe the significant difference in results is a reflection of the difference in milling conditions.

The type IV to Type I polymorph of titanyl phthalocyanine conversion is accomplished by addition of sufficient energy to overcome the activation barrier of the process. As disclosed in Martin et al, stirring in an organic solvent adds sufficient energy to complete this conversion. Stirring is not a milling or grinding process, i.e., the only energy applied is from particle-to-particle collisions, thermal energy of the system (kT), and a minor contribution from interactions with solvent.

A ball mill is a cylindrical container mounted horizontally which is partially filled with milling media. The mill is charged with the pigment/solvent system, otherwise known as the mill base. The milling occurs by rotating the mill about the horizontal axis. Factors which affect the grinding efficiency include: (1) density, shape and size of the media; (2) speed of the mill (RPM); and (3) mill base percent solids, viscosity, density and loading. Grinding occurs through the cascading action of the mill base and milling media. Pigment particles are subjected to impact and shear forces by interaction with the tumbling media, and with each other. This technique has been used for many years in the paint industry.

The high speed media mill, exemplified by the Netzsch mill used in the examples is a member of the latest mill type in milling technology, the media mill. The milling chamber is composed of a media-filled tank equipped with an agitator. Kinetic energy is applied to the media via the rapidly rotating agitator arm. Milling in this manner imparts shear and impact forces on the pigment. However, the magnitude and ratio of these forces differs from a ball mill, since the kinetic energy is applied by an agitator versus cascading beads. Advantages of media milling over ball milling include: (I) increased grinding efficiency by use of smaller media; (2) increased energy output; (3) improved process control; and (4) tighter particle size distribution.

Although both Martin et al and the present specification show a type IV polymorph to a type I polymorph of titanyl phthalocyanine conversion, the electrophotographic properties of the type I polymorphs of the present invention are significantly different from those of Martin et al.. The Applicants believe that this difference is attributed to the difference in milling conditions as described above.

In a preferred embodiment, the type I polymorph of titanyl phthalocyanine according to the invention provide photoconductors with a reduction in photosensitivity of at least −200 V, more preferable of at least −250 V and most preferable of at least −300 V as compared with conventional titanyl phthalocyanine compounds. However, in a further preferred embodiment, the polymorphs of the invention provide such photoconductors with improved dark decay properties.

Another embodiment of the present invention is directed to a photoconductor which comprises a substrate, a charge generation layer, and a charge transport layer, wherein the charge generation layer comprises a polymeric binder and a charge generation compound. The charge generation compound comprises a type I polymorph of titanyl phthalocyanine formed according to the above method of the present invention. In a preferred embodiment, the charge generation layer comprises from about 5 to about 80 weight percent of the charge generation compound and from about 20 to about 95 percent of polymeric binder. In a preferred embodiment, the photoconductor of the present invention can be tuned by choice of pre-milling conditions to give photoconductors with the properties shown in FIG. 1. Dark decay values are also improved over the parent type IV titanyl phthalocyanine-containing photoconductor. In a preferred embodiment, the photoconductor of the present invention has a reduction in photosensitivity of at least −200 V, more preferably of at least −250 V and most preferably of at least −300 V, while exhibiting good dark decay resistance.

The following examples demonstrate various embodiments and advantages of the charge generation layers and photoconductors according to the present invention. In the examples and throughout the present specification, parts and percentages are by weight unless otherwise indicated.

EXAMPLE 1

In this example, photoconductors according to the present invention and comparative photoconductors were prepared using charge generation layers according to the present invention and conventional charge generation layers, respectively. Each of the photoconductors described in this example were prepared by dip-coating a charge generation layer dispersion, followed by dip-coating a charge transport layer dispersion on the formed charge generation layer. In each of the photoconductors, the charge transport compound comprised 30 weight percent of N,N'-diphenyl-N,N'-di(m-toyl)-p-benzidine (TPD) and a polycarbonate binder. In each of the photoconductors, the charge generation compound comprised 45 weight percent of a type I polymorph of titanyl phthalocyanine formed by the method of the present invention comprising a pre-milling of a type IV polymorph solvent mixture in the described Netzsch Media Mill. The pre-milling times of the type I polymorph of titanyl phthalocyanine charge generation compound of the charge generation layers in the respective photoconductors according to this example are described in Table 1. The charge generation layer further comprised a polyvinylbutyral binder. As will be apparent from Table 1, photoconductors 1A–1D are according to the present invention and comprise a charge generation compound of type I polymorph of titanyl phthalocyanine pre-milled between 0.5 and 10.0 hours, whereas photoconductor 1E is a comparative photoconductor in which no pre-milling of the type IV polymorph has occurred.

TABLE 1

| Photoconductor | Pre-Milling Time (hr) |
| --- | --- |
| 1A | 0.5 |
| 1B | 1.0 |
| 1C | 5.0 |
| 1D | 10.0 |
| 1E | 0 |

The photoconductors of this example were subjected to measurement of discharge voltage as a function of energy and milling times.

Sensitivity measurements were made using an electrostatic sensitometer fitted with electrostatic probes to measure the voltage magnitude as a function of light energy shining on the photoconductive surface using a 780 nm laser. The drum was charged by a Corona and the exposed to develop time for all measurements was 222 milliseconds. The photosensitivity was measured as a discharge voltage on the photoconductor drum previously charged to about −700 V, measured by a light energy varying from about 0.1 to about 1.4 $\mu J/cm^2$.

The results of these measurements are set forth in FIG. 1 and demonstrate the surprising results that photoconductors 1A–1D utilizing a charge generation compound containing the pre-milled type I polymorph of titanyl phthalocyanine resulted in decreased photosensitivity as compared to the conventional charge generation layer of the respective photoconductor 1E. As exhibited in FIG. 1, the discharge voltage increases as a function of milling time, thereby evidencing decreased sensitivity.

These results are unexpected as compared to Cosgrove et al., U.S. Pat. No. 5,686,213, in which Cosgrove et al disclose that as milling time increases, the sensitivity increases. In the present example, as the milling time increased, the sensitivity of the photoconductor decreased. The unexpected difference is believed by the applicants to be a result of the differences in milling conditions.

EXAMPLE 2

In this example, photoconductors according to the present invention and comparative photoconductors were prepared using charge generation layers according to the present invention and conventional charge generation layers, respectively. Each of the photoconductors described in this example was prepared by methods similar to those of Example 1. The pre-milling times of the charge generation compound of the charge generation layers in the respective photoconductors according to this example are described in Table 2. As will be apparent from Table 2, photoconductors 2A–2D, 3A–3D, and 4A–4D are according to the present invention and comprise a type I polymorph of titanyl phthalocyanine pre-milled between 0.5 and 10 hours, whereas photoconductors 2E, 3E and 4E are comparative photoconductors comprising a type IV polymorph of titanyl phthalocyanine formed with no pre-milling. As shown in Table 2, photoconductors 2A–2E have an optical density (OD) of 0.8, whereas photoconductors 3A–3E have an optical density of 1.0 and photoconductors 4A–4E have an optical density of 1.1.

TABLE 2

| Photoconductor | Pre-Milling Time | Optical Density (OD) |
| --- | --- | --- |
| 2A | 0.5 | 0.8 |
| 2B | 1.0 | 0.8 |
| 2C | 5.0 | 0.8 |
| 2D | 10.0 | 0.8 |
| 2E | 0 | 0.8 |
| 3A | 0.5 | 1.0 |
| 3B | 1.0 | 1.0 |
| 3C | 5.0 | 1.0 |
| 3D | 10.0 | 1.0 |
| 3E | 0 | 1.0 |
| 4A | 0.5 | 1.1 |
| 4B | 1.0 | 1.1 |
| 4C | 5.0 | 1.1 |
| 4D | 10.0 | 1.1 |
| 4E | 0 | 1.1 |

The photoconductors of this example were subjected to measurement of discharge voltage ( at 0.9 $\mu J/cm^2$) as a function of milling time and optical density.

Figure 2:
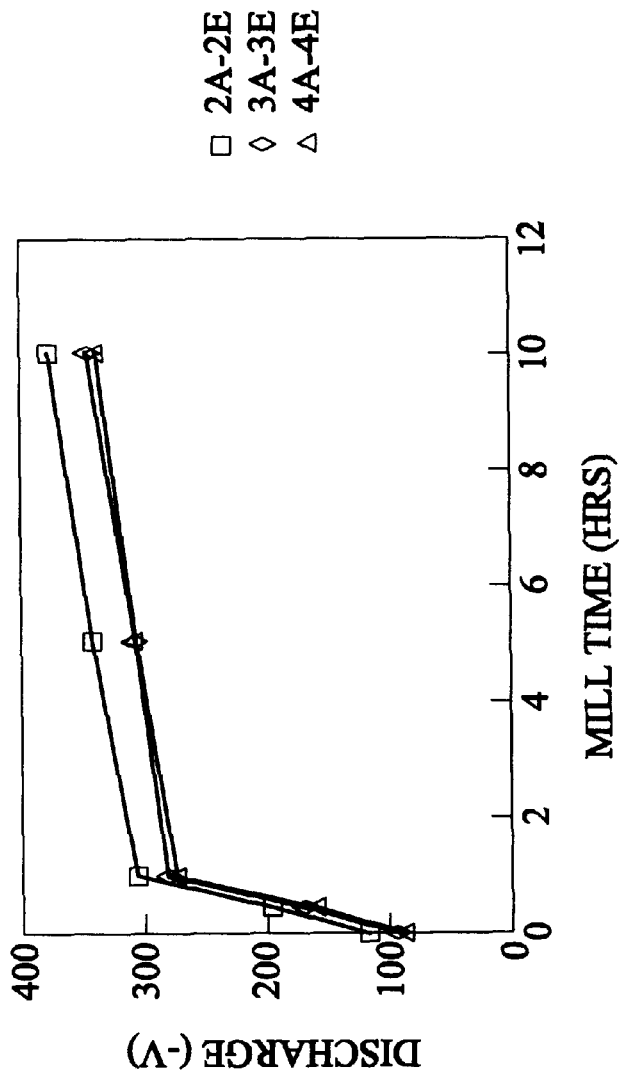
FIG. 2 sets forth electrical performance properties of photoconductors 2A–2D, 3A–3D and 4A–4D according to the present invention wherein the premilling of the charge generation dispersion results in charge generation layers including charge generation compounds comprising a type I polymorph of titanyl phthalocyanine and are made according to the present methods, and electrical performance properties of conventional photoconductors 2E, 3E and 4E wherein the charge generation compounds comprise a type IV polymorph of titanyl phthalocyanine in which no pre-milling has occurred, as described in Example 2.

The results set forth in FIG. 2 demonstrate the surprising results that the discharge voltage increased as a function of milling time, evidencing decreased photosensitivity. A dramatic increase in discharge voltage is noted from the zero hour to one hour pre-milling time. Further milling has a much smaller effect on the discharge potential. As noted in Example 1, Cosgrove et al disclose that photosensitivity increases as a function of milling time.

EXAMPLE 3

In this example, photoconductors according to the present invention and comparative photoconductors were prepared using charge generation layers according to the present invention and conventional charge generation layers, respectively. Each of the photoconductors described in this example was prepared according to methods similar to the methods shown in Example 1. The pre-milling times of the charge generation compound of the charge generation layers in the respective photoconductors according to this example are described in Table 3. As will be apparent from Table 3, photoconductors 5A–5D are according to the present invention and comprise a type I polymorph of titanyl phthalocyanine prepared using pre-milling times ranging from 0.5 hour to 10 hours, whereas photoconductor 5E is a comparative photoconductor comprising a type IV polymorph of titanyl phthalocyanine with no pre-milling. All the photoconductors of the present example have an optical density of 0.8.

TABLE 3

| Photoconductor | Pre-Milling Time |
| --- | --- |
| 5A | 0.5 |
| 5B | 1.0 |
| 5C | 5.0 |
| 5D | 10.0 |
| 5E | 0.0 |

The photoconductors of this example were subjected to measurement of dark decay as a function of milling time.

Dark decay, is the loss of charge from the surface of the photoconductor when it is maintained in the dark. Dark decay also reduces the field that the photoconductor process will experience when light is brought back to the surface, thereby reducing the operational efficiency of the photoconductor. Dark decay measurements were made with an electrostatic tester.

Figure 3:
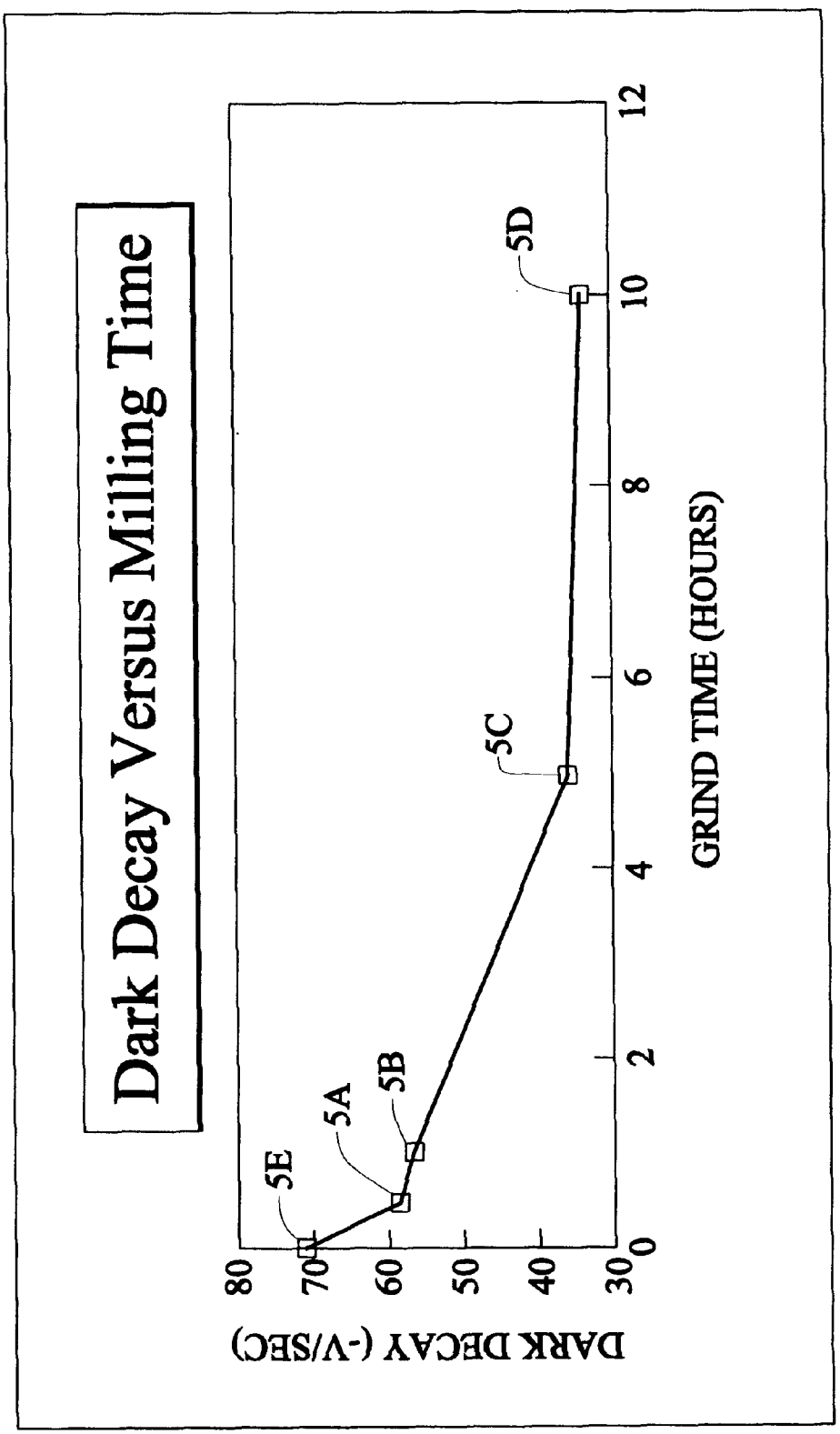
FIG. 3 sets forth electrical performance properties of photoconductors 5A–5D according to the present invention wherein the premilling of the charge generation dispersion results in charge generation layers including charge generation compounds comprising a type I polymorph of titanyl phthalocyanine and are made according to the present methods, and electrical performance properties of a conventional photoconductor 5E wherein the charge generation compound comprises a type IV polymorph of titanyl phthalocyanine in which no pre-milling has occurred, as described in Example 3.

The results set forth in FIG. 3 demonstrate the surprising results that photoconductors 5A–5D utilizing the charge generation layer of the present invention had significant reduced dark decay as compared to the conventional photoconductor 5E.

EXAMPLE 4

In this example, comparative photoconductors were prepared using conventional charge generation layers with the addition of a polymeric binder during the pre-milling. Each of the photoconductors described in this example was prepared according to methods similar to the methods of Example 1, with the additional step wherein a polymeric binder was added to the type IV polymorph of titanyl phthalocyanine during the pre-milling step. The pre-milling times of the charge generation compound and binder of the charge generation layers in the respective photoconductors according to this example are described in Table 4. As will be apparent from Table 4, photoconductors 6A–6D are comparative photoconductors, comprising a type IV polymorph of titanyl phthalocyanine prepared with the addition of a polymeric binder during the pre-milling step.

TABLE 4

| Photoconductor | Pre-Milling Time (hours) |
| --- | --- |
| 6A | 0.0 |
| 6B | 2.0 |
| 6C | 4.0 |
| 6D | 6.0 |

The photoconductors of this example were subjected to measurement of discharge voltage as a function of energy and pre-milling times of the type I polymorph of titanyl phthalocyanine.

The results set forth in FIG. 4 demonstrate that the dramatic difference in sensitivity with milling is strongly dependent upon the milling conditions. Milling in the presence of polymeric binder results in a very small change in photoconductor sensitivity as shown in FIG. 4. However, as noted in Example 1, milling in the absence of the binder yields a dramatic decrease in photosensitivity as a function of milling time. The inventors presume that this dramatic difference between photosensitivities of photoconductors containing a type IV polymorph of titanyl phthalocyanine pre-milled in the presence of a polymeric binder versus those without the polymeric binder is due to a polymorphic change from the type IV to the more thermodynamically stable type I phase. The presence of the polymeric binder presumably is shielding the pigment particles from the full grinding action of the mill.

EXAMPLE 5

In this example, a type I polymorph of titanyl phthalocyanine was prepared using the method of the present invention with varying pre-milling times. The pre-milling times of the type IV polymorphs of titanyl phthalocyanine are described in Table 5. As will be apparent from Table 5, the type I polymorphs of titanyl phthalocyanine 7A–7D are prepared according to the present invention and were prepared using pre-milling times from 0.5 to 10 hours, whereas the type IV polymorph of titanyl phthalocyanine 7E was formed with no pre-milling.

TABLE 5

| Type I polymorph of TiOPc | Pre-Milling Time |
| --- | --- |
| 7A | 0.5 |
| 7B | 1.0 |
| 7C | 5.0 |
| 7D | 10.0 |
| 7E* | 0 |

*no pre-milling, type IV polymorph

The compositions of type I polymorph of titanyl phthalocyanine of this example were subjected to crystal size measurement by means of x-ray diffraction (XRD).

TABLE 6

| Sample | Crystallite Size (angstroms) |
| --- | --- |
| 7A | ~250 |
| 7B | ~350 |
| 7C | ~600 |
| 7D | ~600 |
| 7E* | ~250 |

*no pre-milling, type IV polymorph

The results set forth in Table 6 demonstrate the surprising results that the crystallite size of the type I polymorph of titanyl phthalocyanine is increased with increasing pre-milling time. These results are surprising as the addition of mechanical energy is expected to shrink crystallite size and broaden XRD peaks. However, it is believed that as a result of the nature of the crystallite (shape, electrical properties, Van der Waals forces) and the specifics of milling, the crystallites can coalesce into larger crystallites, therefore sharpening XRD peaks. The sharpness of the peaks can be correlated to crystallite size, with sharper peaks corresponding to larger crystallites. As noted in Table 6, there is an increase in crystallite size of the type I polymorph of titanyl phthalocyanine as the pre-milling time increases from 0.5 hours to 10 hours.

The foregoing description of the various embodiments of the invention has been presented for the purposes of illustration and description. It is not intended to be exhaustive or to limit the invention to the precise form disclosed. Many alternatives, modifications, and variations will be apparent to those skilled in the art of the above teaching. Accordingly, this invention is intended to embrace all alternatives, modifications, and variations that have been discussed herein, and others that fall within the spirit and broad scope of the claims.

We claim:

1. A method for forming a type I polymorph of titanyl phthalocyanine having reduced photosensitivity from a type IV polymorph of titanyl phthalocyanine, the method comprising pre-milling the type IV polymorph of titanyl phthalocyanine with a media mill in the presence of an organic solvent for a period of time sufficient to convert the type IV polymorph of titanyl phthalocyanine to a type I polymorph of titanyl phthalocyanine.

2. The method of claim 1, wherein the pre-milling is conducted for at least 5 minutes.

3. The method of claim 1, wherein the organic solvent comprises methyl ethyl ketone.

4. A method for forming a charge generation layer with reduced photosensitivity from a type IV polymorph of titanyl phthalocyanine the method comprising:
   a) pre-milling the type IV polymorph of titanyl phthalocyanine with a media mill in the presence of an organic solvent for a period of time sufficient to convert the type IV polymorph of titanyl phthalocyanine to a type I polymorph of titanyl phthalocyanine;
   b) dispersing a polymeric binder in an organic solvent to provide a binder dispersion;
   c) media milling the type I polymorph of titanyl phthalocyanine with the binder dispersion;
   d) diluting the milled type I polymorph of titanyl phthalocyanine with a solution comprising a polymeric binder dispersed in an organic solvent to provide a diluted type I polymorph of titanyl phthalocyanine solution; and
   e) coating the diluted type I polymorph of titanyl phthalocyanine solution on a substrate to form an electrophotographic charge generation layer.

5. The method of claim 4, wherein the step of pre-milling lasts for at least 5 minutes.

6. The method of claim 4, wherein the organic solvent comprises methyl ethyl ketone.

7. The method of claim 4, wherein the polymeric binder comprises polyvinyl butyral.

8. A charge generation layer, comprising a binder and a charge generation compound, wherein the charge generation layer comprises a type I polymorph of titanyl phthalocyanine having reduced photosensitivity of at least −250 V produced by the process of claim 4.

9. The charge generation layer of claim 8, wherein the polymeric binder comprises polyvinyl butyral.

10. The charge generation layer of claim 8, comprising from about 5 to about 80 weight percent of the charge generation compound and from about 20 to about 95 weight percent of the polymeric binder.

11. The charge generation layer of claim 10, comprising from about 10 to about 40 weight percent of the charge generation compound and from about 60 to about 90 weight percent of the polymeric binder.

12. The charge generation layer of claim 8, wherein the charge generation layer has reduced dark decay.

13. A photoconductor, comprising a substrate, a charge generation layer and a charge transport layer, wherein the charge generation layer comprises a polymeric binder and a charge generation compound, and further wherein the charge generation layer comprises a type I polymorph of titanyl phthalocyanine having reduced photosensitivity produced by the process of claim 4.

14. The photoconductor of claim 13, wherein the polymeric binder comprises polyvinyl butyral.

15. The photoconductor of claim 13, wherein the charge generation layer comprises from about 5 to about 80 weight percent of the charge generation compound and from about 20 to about 95 weight percent of polymeric binder.

16. The photoconductor of claim 15, wherein the charge generation layer comprises from about 10 to about 40 weight percent of the charge generation compound and from about 60 to about 90 weight percent of polymeric binder.

17. The photoconductor of claim 13, wherein the charge transport layer comprises a binder and a hydrazone charge transport compound.

18. The photoconductor of claim 13, wherein the charge generation layer is situated between the charge transport layer and the substrate.

19. The photoconductor of claim 13, wherein the charge transport layer is situated between the charge generation layer and the substrate.

20. The photoconductor of claim 13, wherein the photoconductor has reduced dark decay.

* * * * *